United States Patent [19]
Goodacre et al.

[11] 4,114,662
[45] Sep. 19, 1978

[54] ARTICULATED ARMS

[75] Inventors: John Purefoy Goodacre, Woodford; Colin Potter, Stockport; Peter Ball, Sheffield, all of England

[73] Assignee: National Supply Company (U.K.) Limited, Stockport, England

[21] Appl. No.: 750,314

[22] Filed: Dec. 14, 1976

[30] Foreign Application Priority Data

Dec. 18, 1975 [GB] United Kingdom ............... 51992/75

[51] Int. Cl.² ............................................. B65G 67/00
[52] U.S. Cl. ................................... 141/387; 137/615
[58] Field of Search ................. 141/387, 388; 137/615

[56] References Cited
U.S. PATENT DOCUMENTS

| 3,372,715 | 3/1968 | Ashton | 141/387 |
| 3,705,610 | 12/1972 | Baudras | 137/615 |

Primary Examiner—William D. Martin, Jr.
Attorney, Agent, or Firm—Sughrue, Rothwell, Mion, Zinn and Macpeak

[57] ABSTRACT

An articulated arm is described which comprises an articulated product tube permittedly connected in use to a fixed product conduit. A product tube support is connected to and pivotal about substantially the same axes of the product tube and one or more counterweights is mounted on and movable with the product tube support so as to balance the weight of the product tube and the support. In order to allow for thermal expansion of the product tube, the product tube support member is connected adjacent its outboard end to the product tube by connection which allows for relative movement between the support and the tube. The tube may be connected to a plate slidably received in a recess in a member mounted on the product tube support.

9 Claims, 6 Drawing Figures

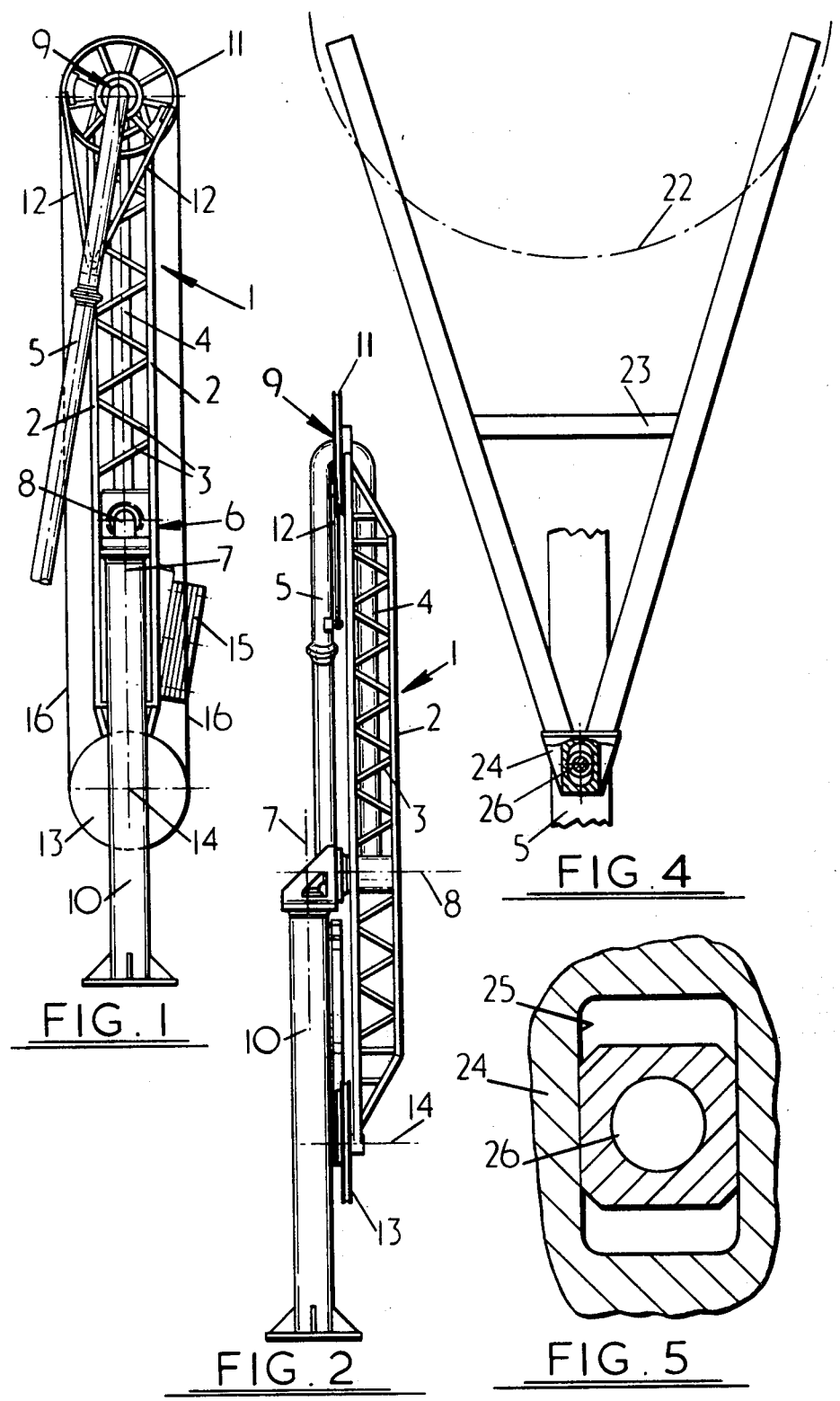

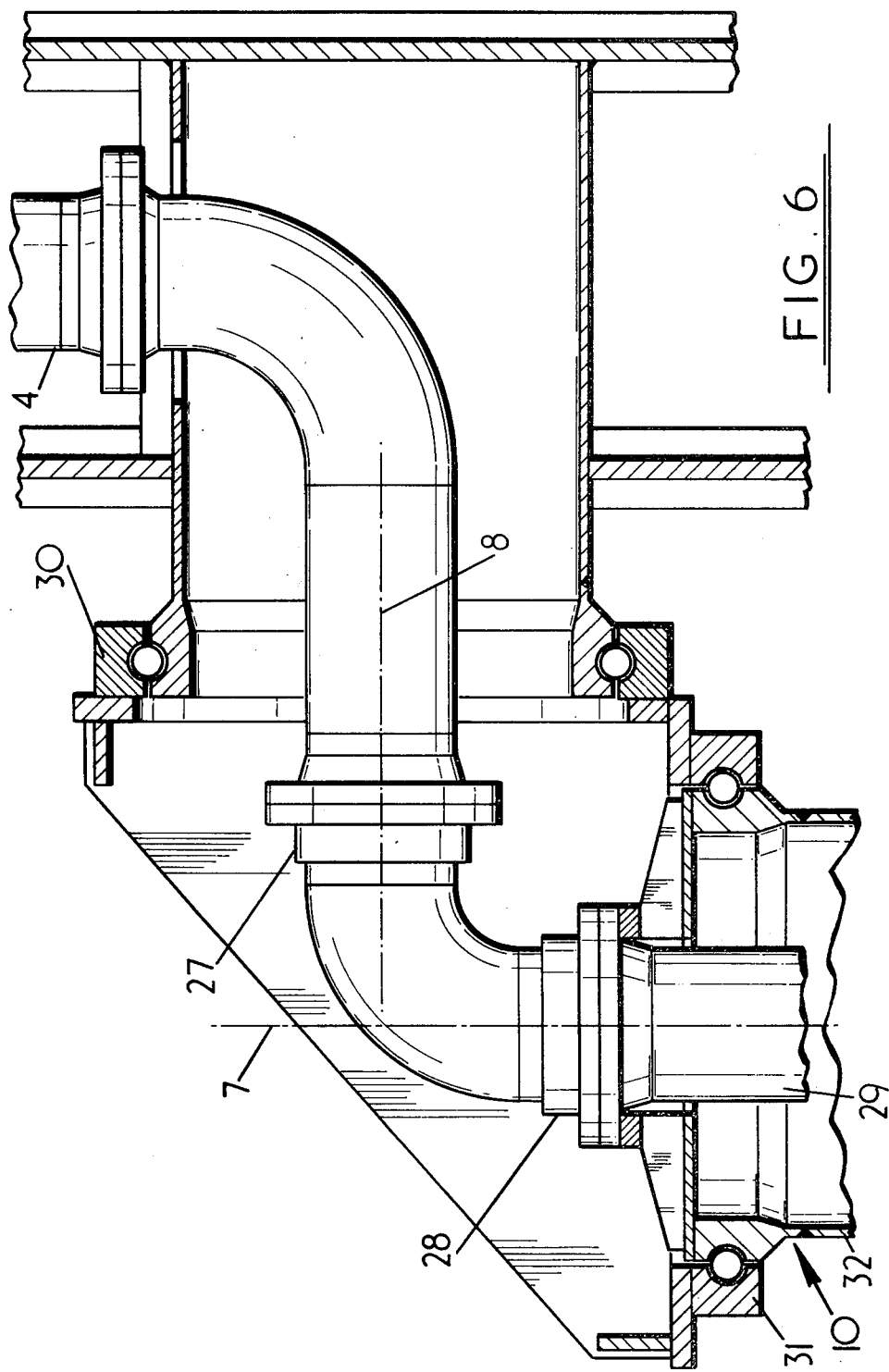

ARTICULATED ARMS

The present invention relates to articulated arms for connecting fixed fluid conduits to manifolds mounted on movable tankers.

Articulated marine arms are well known in the oil industry and are used for example for conveying oil between a fixed conduit or riser on a jetty and an oil tanker anchored to the jetty. Early marine arms comprised product tubes suspended from and controlled by crane devices but in more modern arrangements the product tube and support have been combined to form a unitary structure an integral part of which is the product tube itself.

Where the nature and/or temperature of the product to be conveyed makes it necessary for the product tube to be fabricated from an expensive or relatively difficult to work material, it may be necessary to fabricate the entire unitary structure from that material if destructive differential expansion is to be avoided. This can be costly in terms of materials and labour. Furthermore, as marine arms having product tubes produced from a variety of materials are required for different purposes, it is often necessary to produce marine arms on a "one-off" basis if the whole of the arm is fabricated from the same material as the product tube. The important cost advantages which can result from the production of a series of standard units are thus not normally obtainable.

It is an object of the present invention to obviate or mitigate the above problems.

According to the present invention, there is provided an articulated arm comprising an articulated product tube pivotally connected in use to a fixed product conduit, a product tube support connected to and pivotal about substantially the same axes as the product tube, and one or more counterweights mounted on and movable with the product tube support so as to balance the weight of the product tube and product tube support.

Preferably, the articulated arm comprises a single substantially rigid product tube support member connected adjacent its outboard end to the product tube, the connection between the product tube support and the product tube allowing for relative movement therebetween.

The product tube may be connected to a plate slidably received in an annular recess in a member mounted on the product tube support adjacent its outboard end.

An outboard limb of the product tube may be connected to rotate relative to an inboard limb thereof with a sheave rotatably supported adjacent the outboard end of the product tube support; said sheave being operatively coupled to a further sheave supported adjacent the inboard end of the product tube support and rotatable with a counterweight.

An embodiment of the present invention will now be described by way of example, with reference to the accompanying drawings, in which:

FIGS. 1 and 2 are respectively side and rear elevations of a marine arm according to the present invention;

Figure 3:
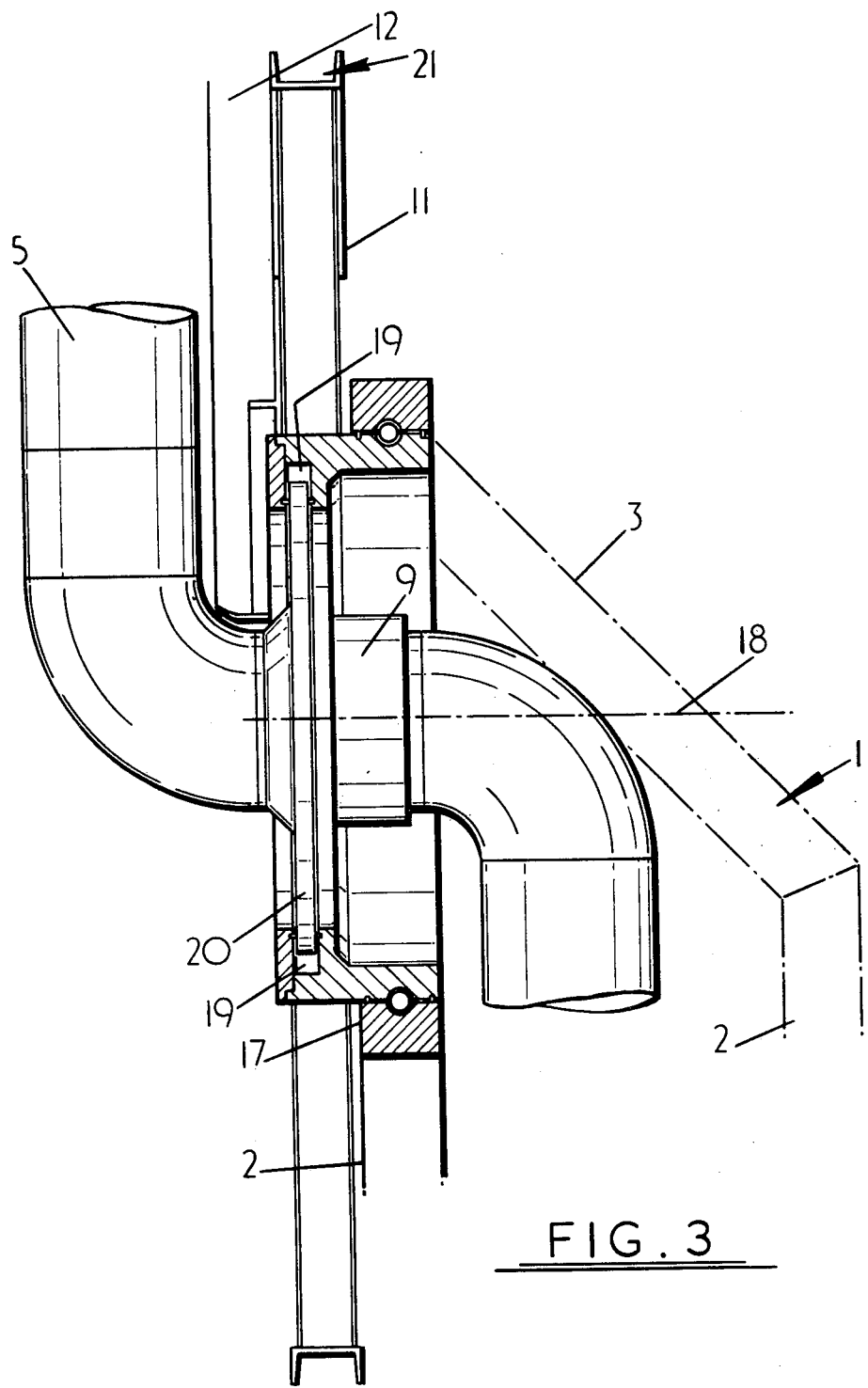
FIG. 3 is a part sectional view of a joint between the limbs of the marine arm of FIGS. 1 and 2.

FIGS. 4 and 5 illustrate details of the connection between the outboard limb and a product tube support of the marine arm of FIGS. 1 and 2; and FIG. 6 is a part sectional view of a bearing assembly connecting the marine arm of FIGS. 1 and 2 and a product riser.

Referring to FIGS. 1 and 2 the illustrated marine arm comprises a product tube support space frame 1 formed from outer tubular members 2 and tubular bracing 3. A product tube comprising an inboard limb 4 and an outboard limb 5 is supported on the space frame 1. The space frame 1 and the inboard limb 4 are mounted on a bearing assembly 6 so as to be pivotal about approximately the same vertical and horizontal axes 7 and 8 respectively.

The two limbs 4, 5 of the product tube are pivotally connected by a swivel 9, the outboard end of the limb 5 (not shown) supporting a connector which may be connected to a tanker manifold (not shown). Fluid such as oil or liquified petroleum gas may be passed from a riser 10 through the bearing assembly 6, limb 4, swivel 9 and limb 5 to the tanker manifold.

The space frame 1 supports an outboard sheave 11 which is pivotal about an axis in the region of the pivoting axis of the swivel 9 and is connected to the outboard limb 5 by struts 12. An inboard sheave 13 is mounted on the space frame 1 so as to rotate about axis 14 with a single counterweight 15. A rope 16 (FIG. 1) is passed around the sheaves 11 and 13.

Referring now to FIG. 3, the outboard end of the space frame 1 and the swivel 9 are shown in detail. A roller bearing 17 supported by the tubular members 2 and 3 making up the space frame is rotatable about a horizontal axis 18. The bearing 17 defines an annular recess 19 in which the edge of a plate 20 is received as a sliding fit. The plate 20 is rigidly secured to the outboard limb 5. The pivoting axis of the swivel 9 interconnecting the inboard and outboard limbs 4, 5 may or may not coincide with the axis 18.

The bearing 17 also supports the outboard sheave 11 which in turn supports the struts 12. The sheave 11 has a channel 21 defined in its periphery to receive the rope 16 (not shown in FIG. 3.

Referring now to FIGS. 4 and 5, details of the arrangement of the struts 12 interconnecting the sheave 11 and the outboard limb 5 will be described. In FIG. 4 an arc 22 defines the outline of the sheave 11 which is not itself shown.

The struts 12 are linked by a cross-member 23 and a slot-defining member 24, details of which are shown in FIG. 5. The member 24 defines an elongate slot 25 in which a pin 26 is slidable. The pin 26 is rigidly secured to the outboard limb 5.

The end of the limb 5 may be connected in use to a manifold within its operating range by pivoting of the limbs 4, 5 and space frame 1. If for example low temperature liquid petroleum gas is passed through the product tube, it will contract whereas the space frame will not. As a result the pivoting axes of the swivel 9 and sheave 11 will be relatively displaced, but this displacement is accomodated by movement of the plate 20 in the recess 19 (FIG. 3) and by sliding of the pin 26 in the slot 25 (FIG. 5).

The linkage between the sheaves 11, 13 provided by the rope 16 ensures that if the limb 5 is pivoted relative to the limb 4, the resulting rotation of the sheave 11 causes a corresponding rotation of the sheave 13 and counterweight 15. Thus variations of the angle between the limbs 4, 5 are substantially balanced by corresponding movements of the counterweight 15 with the sheave 13.

Referring now to FIG. 6, the inboard limb 4 of the product tube is connected to the riser 10 by a swivel 27 which pivots about the horizontal axis 8 and a swivel 28 which turns about the vertical axis 7. The swivels 27 and 28 are of conventional design and the swivel 28 is secured to the inner skin 29 of riser 10.

The space frame 1 is connected to the riser 10 by a bearing 30 rotatable about the horizontal axis 8 and a bearing 31 rotatable about the vertical axis 9. The bearing 31 is secured to the outer skin 32 of the riser 10.

The product tube and space frame are not rigidly connected and therefore great accuracy in the construction of the bearing assembly 6 is not necessary as the axes of the swivels in the product tube and space frame can be relatively displaced to a small extent.

The described embodiment of the invention is designed to accomodate substantial differential expansion between the product tube and the product tube support. Relatively high stresses do however occur at the connection between the outboard limb 5 and the struts 12. For arms which are to operate at ambient temperature where substantial differential expansion is not expected, these high stresses can be reduced by making the outboard limb 5 solid with the sheave 11.

As an alternative to the sliding connection formed by pin 26 and member 24, the outboard limb 5 could be pivotally connected to the sheave 11 for example. Alternatively, the outboard limb 5 could be solid with the sheave 11, an additional swivel being provided in the product tube.

Although in the described embodiment of the invention a single counterweight is arranged to rotate with the inboard sheave mounted at the end of support, it will be appreciated that alternative arrangements could be made. For example, the inboard sheave could be mounted adjacent the horizontal pivot axis of the support, with one counterweight mounted to rotate with the sheave so as to balance the outboard limb of the product tube and a second counterweight mounted at the inboard end of the product tube support.

What we claim is:

1. In an articulated arm for connecting a fixed product conduit to a marine tanker, the improvement comprising:
   a. a product tube including an inboard limb pivotally connected to said fixed product conduit so as to be pivotal relative thereto about fixed axes of said product conduit and an outboard limb pivotally connected to said inboard limb,
   b. a product tube support frame, a bearing assembly pivotally mounting said support frame for pivotal movement about substantially the same axes as said inboard limb,
   c. support means connecting the outboard end of said product tube support frame to said outboard limb of said product tube, said support means allowing relative movement between said outboard end of said product tube support frame and said outboard limb of said product tube, and
   d. a counterweight mounted on said product tube support frame, said counterweight balancing the weight of said product tube support frame and said product tube during the pivotal movement thereof.

2. An articulated arm according to claim 1 wherein said product tube support frame comprises a single, substantially rigid member.

3. An articulated arm according to claim 2, wherein said support means connection is adjacent a point of articulation in said product tube.

4. An articulated arm according to claim 3, wherein said product tube is connected to a plate slidably received in an annular recess in a member mounted on said product tube support frame adjacent its outboard end.

5. An articulated arm according to claim 4, wherein said outboard limb of said product tube is pivotally connected to rotate relative to said inboard limb thereof with a sheave rotatably supported adjacent the outboard end of said product tube support frame; said sheave being operatively coupled to a further sheave supported adjacent the inboard end of said product tube support frame and rotatably with said counterweight means.

6. An articulated arm according to claim 5, wherein said inboard and outboard sheaves are operatively coupled by a flexible coupling extending therearound.

7. An articulated arm according to claim 6, wherein said outboard sheave is linked by struts to said outboard limb of said product tube.

8. An articulated arm according to claim 7, wherein said struts are secured to a member slidably received in a bracket mounted on said outboard limb of said product tube.

9. An articulated arm according to claim 8, wherein said product tube support frame comprises a space frame.

* * * * *